United States Patent

[11] 3,583,530

| [72] | Inventor | Hubert Y. De Venne<br>Meudon-Bellevue, France |
|---|---|---|
| [21] | Appl. No. | 802,033 |
| [22] | Filed | Feb. 25, 1969 |
| [45] | Patented | June 8, 1971 |
| [73] | Assignees | Automobiles Peugeot<br>Paris, France;<br>Regie Nationale Des Usines Renault<br>Billancourt, France |
| [32] | Priority | Mar. 14, 1968 |
| [33] | | France |
| [31] | | 143,652 |

[54] DEVICE FOR ABSORBING ENERGY AND APPLICATIONS THEREOF
10 Claims, 9 Drawing Figs.

[52] U.S. Cl. .................................................. 188/1,
293/70, 297/386
[51] Int. Cl. ...................................................... F16f 7/08
[50] Field of Search .......................................... 188/1 (B),
1 (C); 293/52 (F), 70; 297/386

[56] References Cited
UNITED STATES PATENTS

| 2,401,748 | 6/1946 | Dillon | 188/1(C)UX |
| 2,857,056 | 10/1958 | Dilworth | 188/1(C)X |
| 2,971,566 | 2/1961 | Negroni | 188/1(C)X |
| 3,026,972 | 3/1962 | Hendry et al. | 188/1(C) |
| 3,380,557 | 4/1968 | Peterson | 188/1(C) |
| 3,482,653 | 12/1969 | Maki et al. | 188/1(C) |

*Primary Examiner*—Duane A. Reger
*Attorneys*—Burns, Doane, & Benedict and Swecker & Mathid

ABSTRACT: Device for absorbing and dissipating mechanical energy with no restoration of energy. The device comprises two relatively movable elements. One element carries at least one mass of elastically yieldable material and the other element has an enlarged head having a profile substantially symmetrical relative to a plane transverse to the direction of relative movement of the elements. This head must force its way through the mass by compressing the latter transversely and locally whereby energy is absorbed.

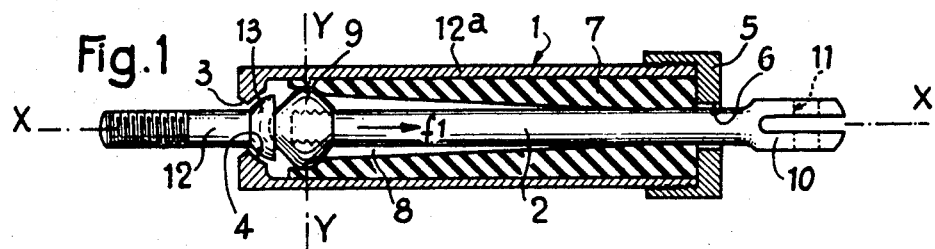
Fig. 1
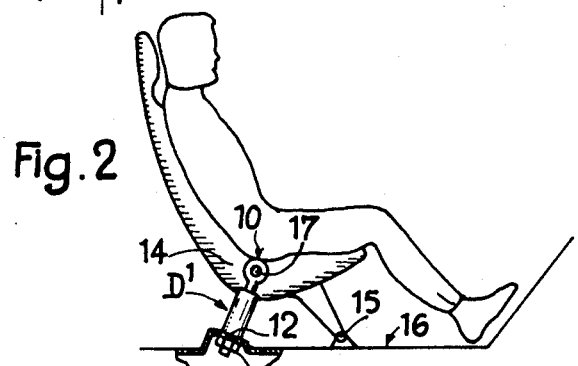
Fig. 2
Fig. 3
Fig. 4

DEVICE FOR ABSORBING ENERGY AND APPLICATIONS THEREOF

The present invention relates to a device for absorbing mechanical energy and more particularly kinetic energy by the creation of an opposing elastically yieldable force, said energy being absorbed and dissipated in the form of heat without restoration of energy in return or any subsequent rebound.

The invention provides a device comprising two elements relatively movable in a given direction, a first of said elements carrying at least one mass of elastically yieldable material and the second of said elements comprising an enlarged head which has a profile substantially symmetrical relative to a plane transverse to said given direction and forms a projection which is such that in the course of said relative movement, said head must force its way through said elastically yieldable mass by compressing the latter transversely and locally as it passes through and consequently absorb energy.

Preferably, the elastically yieldable material is selected from the group comprising neoprene, polyvinyl chloride and vulcanized polyurethane.

The compression of the mass creates a reaction which is perpendicular to the direction of the movement and consequently does not subject the two elements to any relative movement.

It is possible to reuse the device. If indeed a further force tends to create a relative displacement of the two elements due to further energy to absorb, the mass is compressed upon the passage of the head and remains compressed in the region of the new position of the head but automatically resumes its initial position in all the parts thereof which have been abandoned or merely passed through by the head.

According to a preferred embodiment, the two elements are telescopic, one of which consists of a rod terminating in the enlarged head and which moves inside a sleeve of elastically yieldable material fixed in the other element which is cylindrical.

Another object of the invention is to provide the various industrial applications of this absorbing device, for example for vehicles seats, safety belts and straps for passengers, or vehicle bumpers.

Further features and advantages of the invention will be apparent from the ensuing description with reference to the accompanying drawings.

In the drawings:

FIG. 1 is a sectional view of a device according to the invention;

FIG. 2 shows an industrial application thereof in the case of an automobile vehicle seat;

FIG. 3 is a perspective view of a safety belt for the driver of an automobile vehicle, which is secured to the floor of the vehicle by an absorbing device according to the invention;

FIG. 4 is a perspective view on an enlarged scale of a possible connection means between the belt and the energy absorbing device;

Figure 5:
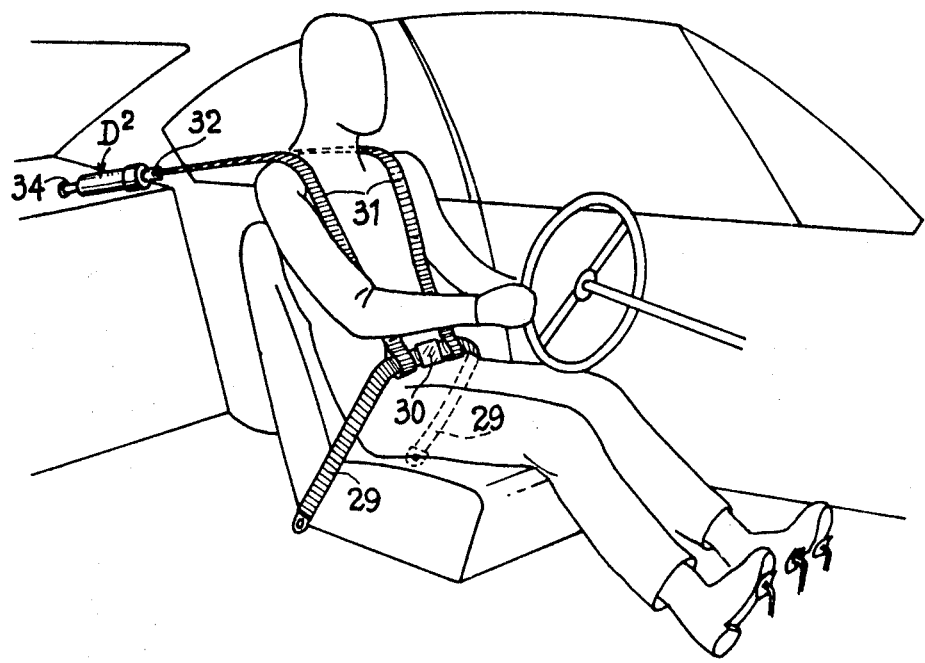
FIG. 5 is a perspective view of a modification of the invention, the absorbing device being combined with a safety harness mounted on a coupe or cabriolet.

In the embodiment shown in FIG. 1, the energy-absorbing device according to the invention comprises two telescopic elements 1 and 2 which are axially movable relative to each other along their common longitudinal axis X-X.

The element 1 constitutes a rigid metal case having at one end an aperture 3 which has a part-spherical inner support face 4. The case is closed at its other end by a tapped plug 5 having an axial aperture 6. The interior of the case 1 is almost completely filled with an elastically yieldable material 7 which defines a preferably conical center cavity 8 whose diameter decreases from the aperture 3 to the plug 5.

The elastically yieldable material 7 employed must possess good qualities of hardness, resilience, load capacity, resistence to aging, good performance at low temperatures (in the case of outside use).

Products satisfying these conditions can be found, although this is not intended to be exclusive, in the range of synthetic materials such as for example neoprene, charged polyvinyl chloride. However, preference is given to an elastomer of vulcanized polyurethane having a Shore A hardness between 80 and 95, such as the product supplied by the Company E. I. DUPONT DE NEMOURS under the trade mark "ADIPRENE" which moreover has the advantage of being capable of being employed either by moulding or injection and which is the product of reaction of a diisocyanate and a polyalkylene glycol ether.

These materials are relatively cheap and light.

Located inside the cavity 8 is the element 2 which consists of a rod terminating adjacent the aperture 3 in a biconical portion or block 9 whose profile is at least roughly symmetrical relative to a transverse plane Y-Y perpendicular to the axis X-X, that is, to the direction of the relative movement between the elements 1 and 2. At the other end of the case 1, the rod passes freely through the aperture 6 of the plug 5 and terminates in pivotal connection means, for example in a fork 10, having an eye 11.

An axial bolt 12 or other fixing means which terminates in a part-spherical head 13 bearing against the support face 4 extends through the aperture 3 of the case 1.

The illustrated device is provided for working under tension. When the tension forces in opposite directions are applied to the fork 10 and to the bolt 12, the device tends to extend and the head 9 of the rod 2 moves relative to the elastically yieldable material 7 in the direction of arrow $f^1$. This head must force a passage by radially compressing the material 7 as it passes through the latter.

As opposed to absorbing devices including lead, in which energy is absorbed in producing the flow of the lead, the elastic properties of the material 7 are here utilized.

The absence of a rebound force is the result of the fact that the elastic deformation of the elastomer occurs in the transverse plane Y-Y, that is, in a direction perpendicular to the direction of relative movement between the case 1 and the rod 2, and of the fact that the enlarged head 9 of the rod 2 has two opposite conical faces of very similar if not identical angles so that the axial component due to the reaction of the elastomer is roughly nil.

It will be understood that the device can operate several times.

Instead of being arranged to operate under tension it can also be arranged to operate under compression or under both tension and compression.

In the embodiment, the case 1, the rod and its head are of revolution about the axis but this is not intended to be exclusive. The case 1 can, for example, be flat in section and the enlarged head also flat which would in this case move between two layers of elastically yieldable material adhered to the wide walls of the case.

Some industrial applications of the device of the invention will now be described by way of examples.

In FIG. 2, a vehicle seat 14 is pivoted in the forward part at 15 to the floor 16 whereas at the rear it is connected to the floor by two energy-absorbing devices $D^1$ arranged in parallel relation. The fork 10 is fixed to the seat 14 by a pin 17 whereas the bolt 12 is connected to the floor by a nut 18. The passenger of the seat is secured to the latter by a belt or safety harness. In the event of impact or sudden stoppage, the passenger is thrown forward. He drags the seat along with him and the kinetic energy is absorbed by the device $D^1$.

FIGS. 3 and 4 show another application in which is provided for securing a vehicle driver to his seat 19 fixed to the floor 20, a "three-point" attachment belt comprising an abdominal strap 21 and a cross-strap 22.

As is known, adjacent the door, the belt 21 is fixed at a point 23 on the floor 20 of the vehicle to the rear of the seat 19 and the diagonal strap 22 is fixed to a point 24 on the upright or post 25 of the door, also slightly to the rear of the seat.

The two parts 21 and 22 of the belt are interconnected in a sliding buckle 26 located on the side of the driver opposed to the door 27. This quick-release buckle 26 of known type is hooked by a ring 28 to the fork 10 of the energy-absorbing device $D^2$.

In the event of a rapid stoppage of the vehicle subsequent to impact, the driver is thrown forward and the force of traction on the belt 21, 22 shifts the rod 2 in the case 1. The elastic deformation of the material 7 under the thrust of the head 9 absorbs the kinetic energy and brakes the movement of the driver.

Figure 6:
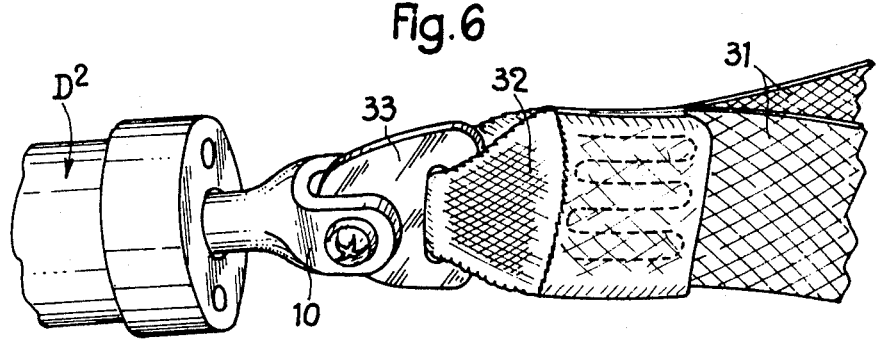
FIG 6 is a perspective view of an enlarged detail of the means connecting the harness to the energy-absorbing device.

FIGS. 5 and 6 show, as a modification of the invention, a possible manner of connecting to a vehicle which does not have a rear seat, such as a coupe or cabriolet, the driver being held in position by a harness comprising two semiabdominal straps 29 interconnected by a quick-release buckle 30 and two shoulder straps 31. The latter are interconnected at 32 on a member 33 maintained in the fork 10 of the energy-absorbing device $D^2$ which is fixed at its other end to a point 34 of the body of the vehicle.

Figure 7:
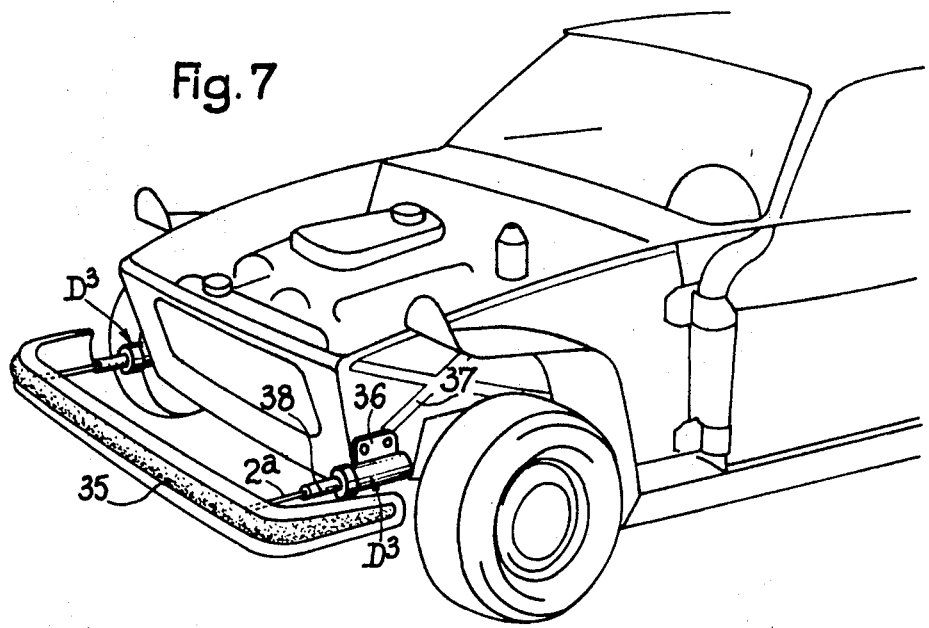
FIG. 7 is a perspective view, partly cut away, of the front end of an automobile vehicle whose bumper is mounted by means of two energy-absorbing devices according to the invention.
Figure 8:
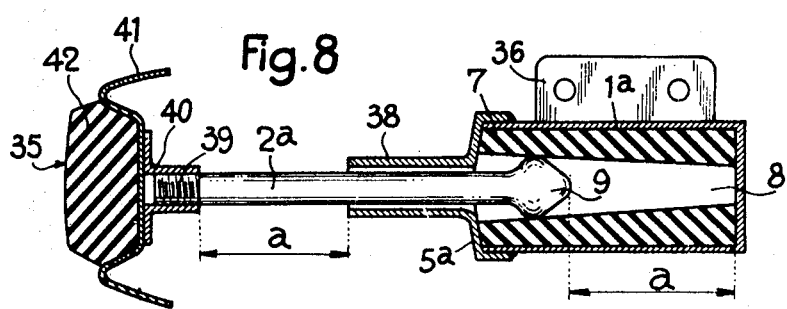
FIG. 8 is a sectional view on an enlarged scale of the energy-absorbing device, shown in FIG. 7; and, FIG. 9 is a view similar to FIG. 7 of the front of the automobile in the completely finished state.
Figure 9:
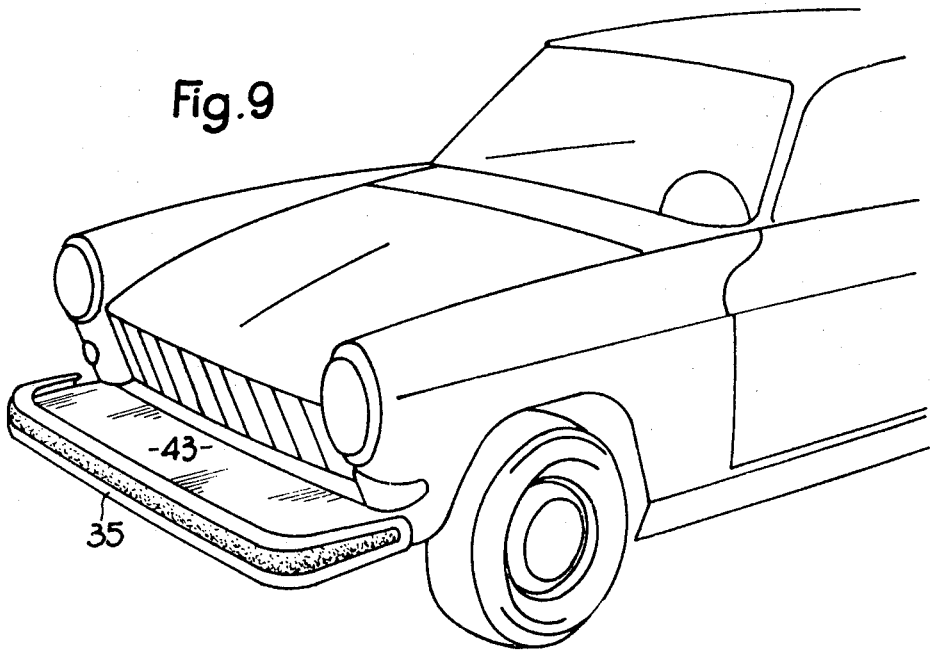

FIGS. 7—9 relate to the application of energy-absorbing devices $D^3$ to a front bumper (or rear bumper) of an automobile vehicle. In FIG. 7, for reasons of clarity, the wings, the bonnet and the grille of the vehicle have been removed so as to more clearly show the mounting of the bumper 35 by means of two absorbing devices $D^3$ which are adapted to absorb the maximum of energy, these devices being adapted to work under compression.

The case 1 of each of these devices comprises at least one lug 36 for fixing it to the body 37 of the vehicle.

The front part of this cylinder 1 is closed by the tapped plug $5^a$ provided with a hollow stem 38 adapted to guide the rod $2^a$. This rod terminates internally in the biconical head 9 (FIG. 8) and externally in a screw thread 39 adapted to be screwed into a nut 40 which is fixed by welding or other means to the bar 41 of the bumper 35.

The interior of the cylinder $1^a$ is almost completely filled with an elastically yieldable material 7 defining a center cavity 8 which is preferably frustoconical and has its maximum diameter adjacent the plug $5^a$, and less than that of the head 9.

In the mounted position, this head 9 is placed near the plug $5^a$ and the rod $2^a$ has between the guide 38 and the nut 40 a length $a$ equal to the distance between the head 9 and the end of the cylinder $1^a$.

The bar 41 of the bumper can be advantageously, although not necessarily, provided with a bead 42 of rubber or other elastomer.

In order to hide the fixing unit a light covering element 43 can be placed thereover (FIG. 9). This element is solid or apertured but of negligible stiffness so as not to hinder operation of the energy-absorbing devices $D^3$.

The operation of this device is obvious:

When a violent impact occurs at the front of the vehicle, the or each rod $2^a$ tends to move into the cylinder $1^a$ wherein the head 9 is energetically braked by the mass of elastically yieldable material opposing its movement.

As all the kinetic energy is consumed in the elastic radial deformation of this material there is no restoration of energy at the end of the travel and consequently no rebound.

The device $D^3$ is the more effective in its function as safety means for the occupants of the vehicle as the length $a$ is greater. For a given effectiveness, this length $a$ must be the greater as the rigidity of the vehicle is greater.

Further, it is easy to determine by trial the dimensions of the devices $D^3$ which preclude operation of the devices upon slight impact which could be absorbed by the rubber bead 42.

An identical fixing arrangement could of course be employed for the rear bumper.

Although specific embodiments of the invention have been described, many modifications and changes may be made therein without departing from the scope of the invention as defined in the appended claims.

I claim:

1. A device for absorbing and dissipating mechanical energy with no restoration of energy, said device comprising two telescopic elements relatively movable in a given direction, a first of said elements having a tubular shape and carrying at least one sleeve of elastically yieldable material and the second of said elements being a rod comprising an enlarged head which has a profile substantially symmetrical relative to a plane transverse to said given direction and has its maximum cross section in said plane, said head having a transverse dimension greater than the inner dimension of said sleeve and forming a projection which is such that, in the course of said relative movement, it must force its way through said sleeve of elastically yieldable material by compressing the latter transversely and locally as it passes through.

2. A device as claimed in claim 1, wherein the elastically yieldable material is vulcanized polyurethane.

3. A device as claimed in claim 2, wherein said polyurethane has a Shore A hardness of between 80 and 95.

4. A device as claimed in claim 1, wherein the elastically yieldable material is neoprene.

5. A device as claimed in claim 1, wherein the elastically yieldable material is polyvinyl chloride.

6. A device as claimed in claim 1, wherein said enlarged head has a substantially biconical shape.

7. A device as claimed in claim 6, wherein the axial cavity of said sleeve is frustoconical and converges in the direction of the movement of said second element into said first element.

8. A vehicle comprising a floor, a seat connected to the floor in the front part of the seat to pivot about a transverse axis, and an energy absorbing device connecting the rear part of the seat to the floor, said device comprising two telescopic elements relatively movable in a given direction, a first of said elements having a tubular shape and carrying at least one sleeve of elastically yieldable material and the second of said elements being a rod comprising an enlarged head which has a profile substantially symmetrical relative to a plane transverse to said given direction and has its maximum cross section in said plane, said head having a transverse dimension greater than the inner dimension of said sleeve and forming a projection which is such that, in the course of said relative movement, it must force its way through said sleeve of elastically yieldable material by compressing the latter transversely and locally as it passes through one of said elements being connected to the seat and the other element being connected to the floor.

9. A vehicle comprising a safety belt or harness and an energy absorbing device for connecting the safety belt or harness to the vehicle, said device comprising two telescopic elements relatively movable in a given direction, a first of said elements having a tubular shape and carrying at least one sleeve of elastically yieldable material and the second of said elements being a rod comprising an enlarged head which has a profile substantially symmetrical relative to a plane transverse to said given direction and has its maximum cross section in said plane, said head having a transverse dimension greater than the inner dimension of said sleeve and forming a projection which is such that, in the course of said relative movement, it must force its way through said sleeve of elastically yieldable material by compressing the latter transversely and locally as it passes through and means for connecting one of said elements to the belt or harness and means for connecting the other element to the vehicle.

10. A bumper for a vehicle comprising a bar, and two energy-absorbing devices connecting said bar to the vehicle, each device comprising two telescopic elements relatively movable in a given direction, a first of said elements having a tubular shape and carrying at least one sleeve of elastically yieldable material and the second of said elements being a rod comprising an enlarged head which has a profile substantially symmetrical relative to a plane transverse to said given direction and has its maximum cross section in said plane, said head having a transverse dimension greater than the inner dimension of said sleeve and forming a projection which is such that, in the course of said relative movement, it must force its way through said sleeve of elastically yieldable material by compressing the latter transversely and locally as it passes through.